May 9, 1961  J. F. WYNN  2,983,202
HIGHWAY MARKING PAINT
Filed Oct. 21, 1957
Fig.1
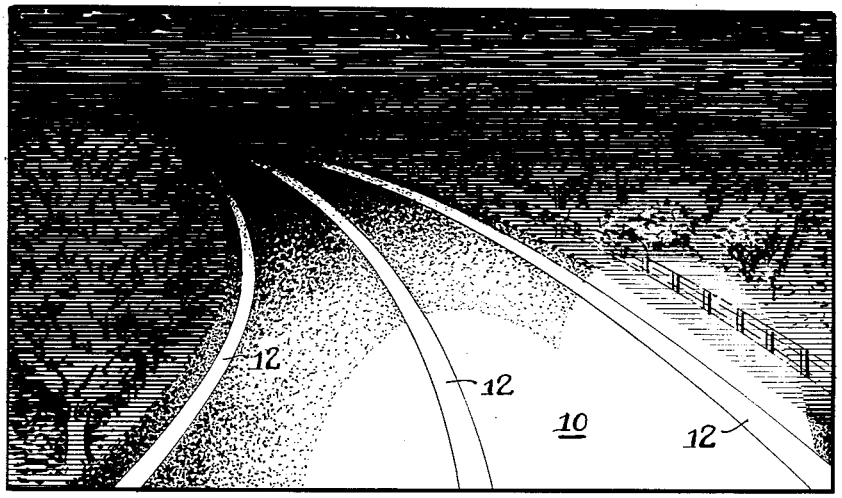
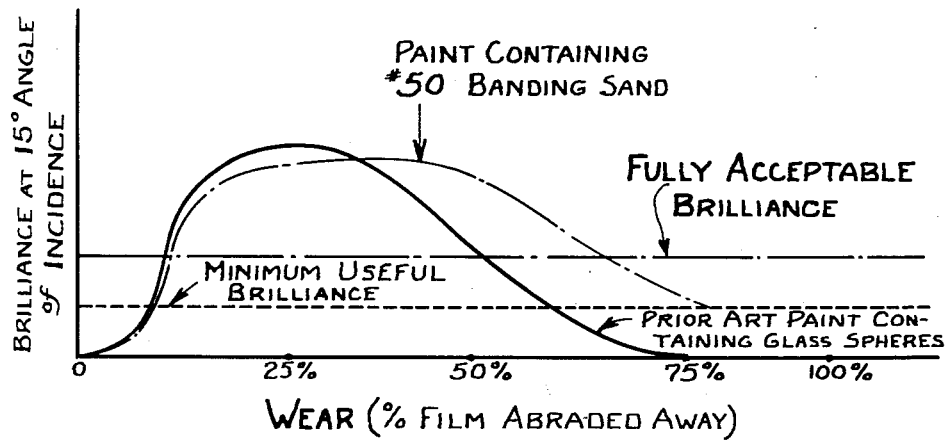
Fig.2
Inventor
James F. Wynn,
By Schneider, Dressler & Goldsmith,
Attys.

United States Patent Office 2,983,202
Patented May 9, 1961

2,983,202

HIGHWAY MARKING PAINT

James F. Wynn, Marietta, Ohio, assignor to American-Marietta Company, a corporation of Illinois Filed Oct. 21, 1957, Ser. No. 691,183

14 Claims. (Cl. 94—1.5)

The present invention relates to highway marking paints adapted to be sprayed, rolled or brushed on highway surfaces subject to vehicular traffic to provide reflex light-reflective traffic markers, e.g., lines having high nighttime visibility to motorists. The highway marking paints of the invention possess enhanced durability under normal conditions of abrasive vehicular wear and they can be produced at lower cost, loaded with reflex reflecting elements to a greater extent and with improved suspension characteristics and provide greater resistance to skid than conventional reflex reflective highway marking paints.

To the present time, the production of commercially suitable reflex reflective traffic markers has always been considered to require as an essential feature thereof, the use of transparent, smooth surfaced particles, e.g. glass spheres or beads to provide the reflex reflective action. Customarily, a paint composition was applied to the highway and glass beads applied to the previously laid and partially dried paint. The reflective traffic markers so formed provided adequate initial reflex reflective qualities. However, the reflex reflective quality was short lived and not durable. Also, the two-stage application procedure was slow and laborious and added to the cost of producing the traffic marker.

In the United States patent to Heltzer, No. 2,574,971, dated November 13, 1951, "Highway Marking Paint Containing Glass Beads," the transparent glass spheres or beads were incorporated in the paint and the paint and the glass spheres applied together in a single stage. The paint film above the beads of this composition is worn away to expose the tops of the beads and in this manner a reflex reflective surface is developed through wear. The durability of the reflex reflective action, although somewhat improved, does not provide the high standards of nighttime visibility for adequately long periods of time.

When only a small proportion of the top of a given bead is exposed, the reflex reflective action is poor. A smooth glass bead has a high reflectance value when observed from a 90° angle. This, however, is not the normal observation angle of motorists. On the highway, the normal viewing angle is of the order of 15 degrees or less. At the normal viewing angle, an embedded glass bead loses most of its reflectivity. When a larger proportion of the bead is exposed, the bead becomes easily dislodged and the surrounding paint is subjected to heavy wear. Thus, the reflex reflective action is limited by these two factors. When the beads become sufficiently exposed to participate effectively in the reflex reflective action, they tend to become easily dislodged. The effectiveness and durability of the traffic marker is thus substantially impaired.

When the marking paint is applied to the highway itself, the dislodged beads do more than reduce the reflective quality and durability of the marker, for these dislodged beads act as ball bearing surfaces to increase the tendency of dangerous skids by vehicles, especially under wet traffic conditions.

The present invention is based on the discovery that, contrary to the general belief in the art, substantial reflex reflective qualities can be produced using particles of critical size and index of refraction which are not transparent, but translucent, and which are not smooth surfaced but which are rough. Moreover, these particles need not be spherical or even substantially spherical but may desirably be irregular in shape.

It has been found that crystalline silicon dioxide particles of substantially pure silica having a refractive index above 1.41 which are translucent and rough-surfaced and which have a particle size passing through a #60 U.S. Standard Screen and retained by a #270 U.S. Standard Screen and the bulk of which are preferably retained by a #140 U.S. Standard Screen while passing through a #80 U.S. Standard Screen, form effective reflex reflective elements when incorporated in an otherwise conventional reflective traffic paint in amounts of from about 3 to 8 pounds per gallon of paint composition. The rough-surfaced irregularly shaped silicon dioxide particles become keyed to the layer of paint and provide enhanced resistance to dislodgement as compared with the smooth surfaced transparent spheres or beads of the prior art. This keying action permits a larger portion of the upper surface of the reflex reflective element to protrude prior to dislodgement and effective night visibility is retained for longer periods of time. The dislodged particles, because of their rough surface and somewhat irregular shape are less adapted in comparison with the smooth spheres of the prior art to act as ball bearings and in this manner the danger of skids is reduced.

The effective reflex reflective action which is achieved in accordance with the invention is particularly surprising in the light of prior disclosures such as the indication in the United States patent to Gill, No. 1,902,440, where it is indicated that the return of light toward the source is to be distinguished from the general diffused flow of the usual rough heterogeneous surface.

The translucent rough-surfaced particles of the invention may desirably be constituted by quartz sand which is composed of substantially pure silica and which possesses the desired high index of refraction of approximately 1.41 to 1.54.

Ordinary sand has previously been incorporated in paints and even in paints which have been adapted for use as highway marking paints. In many of the prior paints the sand has been employed as a filler or bodying component in which instance the sand was very finely divided and of no utility to produce effective reflex reflection. In some instances, as for example in United States Patents Nos. 1,986,591, 2,347,233 and 2,355,430, the sand has been supplemented by reflective elements because the sand would not satisfactorily provide a reflex reflective function. In other instances, large particles of sand (too large to provide the desired reflex reflective action) were incorporated in highway marking paints to provide, because of their hardness, protection for other reflective elements of inadequate hardness.

Accordingly, the fact that translucent rough-surfaced particles of substantially pure silica in the form of quartz or other crystalline silicon dioxide material having an index of refraction of approximately 1.41 to 1.54 and having a critical size would provide an effective reflex reflective action to provide acceptable night-time visibility to traffic stripes is indeed surprising.

A typical satisfactory particle size is as follows:

| Sieve Size | Percent of Mixture Passing Through |
| --- | --- |
| U.S. Standard No. 60 sieve | 100 |
| U.S. Standard No. 80 sieve | 80 |
| U.S. Standard No. 140 sieve | 15–30 |
| U.S. Standard No. 230 sieve | 0–10 |
| U.S. Standard No. 270 sieve | 0 |

The particles are desirably irregular in shape and free from dirt.

EXAMPLE 1

A particularly preferred translucent rough-surfaced and hard particulate silicon dioxide is known in the trade as #50 Banding Sand and has the following composition and screen analysis:

*Screen analysis for #50 Banding Sand*

| U.S. Standard Screen | Cumulative Percent Retained | Percent Retained |
| --- | --- | --- |
| #50 | 2 | 2 |
| 70 | 32 | 30 |
| 100 | 72 | 40 |
| 140 | 92 | 20 |
| 200 | 98 | 8 |

*Chemical analysis for #50 Banding Sand*

| | |
| --- | --- |
| $SiO_2$ | 99.45 |
| $Fe_2O_3$ | .074 |
| $Al_2O_3$ | .29 |
| $TiO_2$ | .028 |
| CaO | .04 |
| MgO | .01 |
| Loss on ignition | .07 |

It is to be noted that larger particles may be present (e.g., particles which will not pass through a No. 60 sieve). However, these larger particles are not adapted to a paint intended to be sprayed using conventional spray equipment and such paints can be applied in other ways, e.g., by brushing or by the use of spreaders. The larger particles, although they may be present, unduly diffuse the light and do not provide the desired reflex reflective properties. Particles smaller than that retained by a #270 sieve are preferably excluded from the paint because these particles thicken the paint and provide little reflective action.

EXAMPLE 2

A typical varnish base coat is as follows:

Varnish base:
| | | |
| --- | --- | --- |
| Phenolic modified pentaerythritol ester of rosin | lbs | 119 |
| Hydrocarbon resin (Piccopale 100) | lbs | 119 |
| China-wood oil | gal | 11.89 |
| Bodied linseed oil | gal | 11.89 |
| V.M. & P. naphtha | gal | 57.80 |

In the above varnish base, the phenolic modified pentaerythritol ester of rosin is desirably the product "Pentalyn" 802A manufactured by Hercules Powder Co. and having the following specifications:

| | |
| --- | --- |
| Softening point | 165°–170° C. |
| Color | K–. |
| Acid number | 15–22. |

Viscosity at 25° C.:
(a) Linseed oil dispersion (40% resin/60 oil) — 400+20 poises (min.). 600+20 poises (max.).
(b) Toluol (G.H.) (50% solids) — C (min.). G (max.).

The hydrocarbon resin in the above varnish base is desirably of polymerized unsaturated petroleum monomers consisting essentially of diene and reactive olefins and having an average molecular weight of 90. These unsaturated monomers are polymerized to form a hard solid having an average molecular weight of 1100. Such a hydrocarbon resin is manufactured by Pennsylvania Industrial Chemical Company as "Piccopale" 100 having the following specification:

| | |
| --- | --- |
| Softening point | 100° C. |
| Specific gravity at 25° C. | .970–.975. |
| Color | 13 Gardner-Holdt scale. |
| Acid number | Less than 1. |
| Saponification number | Less than 2. |
| Iodine value (Wijs) | 120. |
| Bromine number | 7.3. |

The varnish base above specified is prepared by heating the admixed "Pentalyn" 802A, "Piccopale" 100, China-wood oil and 8 gallons of linseed oil in a kettle at 560° F. for 45 minutes. The heated mixture is then chilled by the addition of 3.89 gallons of linseed oil and allowed to cool to 350° F. whereupon the naphtha is added to the mixture. This varnish is employed in a paint composition as follows:

| | Lbs. |
| --- | --- |
| Varnish | 368.5 |
| Titanium dioxide pigment | 247.0 |
| Magnesium silicate | 126.0 |
| #50 Banding Sand | 400.0 |
| Toluene | 91.0 |
| V.M. & P. naphtha | 25.0 |
| 6% cobalt drier | .5 |
| 24% lead drier | 1.5 |

This paint is compounded by mixing in particulate solids such as pigment and fillers. Titanium dioxide and the magnesium silicate, for example, are mixed with 144.6 lbs. of varnish and the mixture is ground on a paint mill. The driers are then added and the remainder of the varnish and the #50 Banding Sand is mixed thoroughly into the mixture. The toluene and naphtha thinners are then added. This paint had a viscosity of 75 Krebs units and a total solids content of 77%. The weight proportions of this paint are as follows:

| | Percent |
| --- | --- |
| Pigment | 29.62 |
| Vehicle solids | 15.8 |
| #50 Banding Sand | 31.78 |
| Thinner and drier | 22.8 |

The finished paint can be applied with spray, brush or roller. Small amounts of naphtha may be used to compensate for individual application technique. If long storage is contemplated, small amounts of antisettling agents, such as calcium linoleate, may be used for suspension.

It has been found that the rough, irregularly shaped particles are more satisfactorily maintained in suspension than spherical beads. This is particularly true for the heavier particles, e.g., those retained by a 60 mesh screen.

EXAMPLE 2A

| | Lbs. |
| --- | --- |
| Non-chalking titanium dioxide | 130.48 |
| Semi-chalking titanium dioxide | 130.48 |
| Hydrous aluminum silicate | 1.11 |
| Calcium linoleate pulp | 8.20 |
| Varnish | 106.51 |

The above materials were ground to form a paste by passing the mixture over a 3 roll-mill. The paste was discharged into the following slurry:

| | Lbs. |
| --- | --- |
| Talc | 113.14 |
| Toluol | 58.34 |
| Varnish | 46.24 |

After all the paste had been run into the slurry, the following mixture was added:

| | Lbs. |
| --- | --- |
| Varnish | 236.43 |
| Morpholine-water mix | 9.04 |
| Cobalt naphthenate | 5.10 |

| | Lbs. |
|---|---|
| Lead naphthenate | 1.58 |
| Toluol | 37.93 |
| V.M. & P. naphtha | 26.48 |
| #50 Banding Sand | 220.42 |

Loss of about 3% occurred during the above described operations to produce a yield of 100 gallons of a white traffic marking paint.

It has been found that the calcium linoleate used in this example provides an enhanced suspending action for particulate material. Aluminum stearate may be used in place of the calcium linoleate in corresponding amount to obtain substantially equally good suspending characteristics.

EXAMPLE 3

The following illustrates a paint composition employing as the vehicle a phthalic alkyd resin containing 30% phthalic anhydride having a soya modification of 55%, the alkyd resin being prepared using glycerin as the polyhydric alcohol and having the following characteristics in a 60% petroleum spirits solution:

| | |
|---|---|
| Solids | 60%. |
| Viscosity | Z1–Z3 Gardner-Holdt. |
| Color (Hellige) | 1–3. |
| Acid number | 4–6. |
| Pounds per gallon | 7.8. |
| Phthalic anhydride | 30% (on resin solids). |
| Oil acid content | 50% (on resin solids). |
| Type of oil | Soya. |

An alkyd resin of the above composition and having the characteristics stated is sold by General Electric Company under the trademark "Glyptal" 2475.

| Paint composition: | Lbs. |
|---|---|
| Titanium dioxide | 225 |
| Phthalic alkyd (50% solids) | 400 |
| Calcium carbonate | 125 |
| #50 Banding Sand | 400 |
| V.M. & P. naphtha | 116 |
| Cobalt drier | .5 |
| Lead drier | 1.5 |

This paint was prepared by adding the titanium dioxide and calcium carbonate to 300 lbs. of the phthalic alkyd vehicle. This mixture was ground on a paint mill and the remainder of the vehicle added. The #50 Banding Sand was then stirred in thoroughly and the naphtha and driers added.

Example 3 is modified by using as the vehicle for the paint a 30% phthalic pentaerythritol alkyd resin modified with 54% of an oil consisting of equal parts by volume of linseed oil and soya oil having the following characteristics:

| | |
|---|---|
| Solids | 50%. |
| Solvent | 50% V.M. & P. naphtha, 50% mineral spirits |
| Acid number | 10.2. |
| Color | 7 (Gardner-Holdt). |
| Pounds per gallon | 7.50. |
| Viscosity | V–W (Gardner-Holdt). |

This alkyd is sold by American-Marietta Company under No. "SV-141-B7."

EXAMPLE 4

The reflectorized paint may also be of the emulsion type as is illustrated by the following:

| Pigment grind | Lbs. |
|---|---|
| Water | 20.0 |
| Tetrasodium pyrophosphate decahydrate, 10% aqueous solution | 10.0 |
| "Emulphor" EL–719 dispersing and wetting agent | 2.0 |
| "Polyglycol" P–1200 polypropylene glycol | 2.0 |
| "Carbitol" — diethylene glycol monoethyl ether | 25.0 |
| Dibutyl phthalate | 18.0 |
| ASP–400 clay | 75.0 |
| Titanium dioxide | 100.0 |
| Reduction: | |
| Water | 130.0 |
| "Methocel" 400 methyl cellulose, 2.0% aqueous solution | 260.0 |
| Du Pont "Elvacet" 81–900 polyvinyl acetate emulsion | 320.0 |
| #50 Banding Sand | 300.0 |

The Du Pont "Elvacet 81–900" polyvinyl acetate emulsion is a dispersion of polyvinyl acetate resin and water. The polyvinyl acetate resin is a thermoplastic, water-insoluble, colorless, odorless material having density at 20° C. of approximately 1.2 and a refractive index of approximately 1.467. Specifications are:

| | |
|---|---|
| Solids | percent__ 55 |
| Pounds per gallon | 9.2 |
| Viscosity at 25° C. | centipoises__ 800–1000 |
| pH | 4–6 |

"Emulphor EL–719" is a polyoxyethylated vegetable oil which is used to promote wetting and stabilize the emulsion.

The "Polyglycol P–1200" is a polypropylene glycol with an approximate molecular weight of 1200. It is formed by the addition of propylene oxide to propylene glycol. P–1200 acts as an anti-foaming agent for the emulsion.

EXAMPLE 5

Resin solution types, either synthetic or natural, can be used, giving a quick drying paint resistance to wear. Typical example:

| | Lbs. |
|---|---|
| Titanium dioxide | 200.0 |
| Resin solution (50% manila resin-alcohol) | 400.0 |
| Magnesium silicate | 125.0 |
| #50 Band Sand | 400.0 |
| Ethyl alcohol | 116.0 |

When synthetic resins are used, the thinner is simply varied to give optimum results. These reflectorized center line paints dry quickly by evaporation although in general they are not as tough as resinous paints.

Under abrasion, due to wear by vehicular traffic, the surface of the above exemplary paints wears away to expose the silica particles for their reflex reflective function.

The invention is illustrated in the accompanying drawing in which:

Fig. 1 is a pictorial view of a highway or roadway taken at night and provided with line marking stripe coatings in accordance with the invention after vehicular traffic has abraded the coating to expose the rough translucent particles to provide reflex reflectivity; and Fig. 2 is a graph indicating the comparative efficacy of a line marking stripe in accordance with the invention and a prior art paint containing transparent glass spheres.

Referring to Fig. 1, the numeral 10 designates a roadway or highway surface normally subjected to vehicular traffic and having a coating painted in a stripe thereupon and constituting the lines 12. The lines 12 have been worn to bare the upper surfaces of the quartz particles and function to redirect the beam of light from a motorist's headlights back to the motorist to provide a marked degree of brilliance to the lines.

Fig. 2 illustrates the improvement of the invention over the prior art paints embodying the use of transparent glass beads.

Although the invention has been described in connec-

I claim:
1. A reflective highway marking paint consisting essentially of an organic film-forming vehicle containing a pigment dispersed therein to form a paint composition and translucent, crystalline silicon dioxide particles in amounts of from about 3 to 8 pounds of silicon dioxide particles per gallon of paint composition, said crystalline material having a refractive index in the range of between about 1.41 and about 1.54 and being of a particle size retained by a #270 U.S. Standard Screen and passed by a #60 U.S. Standard Screen and being irregularly shaped and rough-surfaced to provide light reflecting surfaces.

2. A reflective highway marking paint as recited in claim 1 in which said vehicle is a drying-oil-base varnish vehicle.

3. A paint as claimed in claim 2 wherein said varnish vehicle is a vegetable oil modified alkyd resin of phthalic anhydride and glycerin which is dispersed in an organic solvent.

4. A reflective highway marking paint consisting essentially of an organic film-forming vehicle containing a reflective pigment dispersed therein to form a paint composition and translucent crystalline silicon dioxide particles in amounts of from about 3 to 8 pounds of silicon dioxide particles per gallon of paint composition, said crystalline material having a refractive index in the range of between about 1.41 and about 1.54 and being of a particle size retained by a #270 U.S. Standard Screen and passed by a #60 U.S. Standard Screen and being irregularly shaped and rough-surfaced to provide light reflecting surfaces.

5. A paint as claimed in claim 4 wherein said reflective pigment includes titanium dioxide.

6. A paint, free from a thickening agent, as claimed in claim 4, wherein said reflective pigment consists of a combination of titanium dioxide and calcium carbonate.

7. A reflective highway marking paint consisting essentially of an organic film-forming vehicle containing a pigment dispersed therein to form a paint composition and translucent quartz particles in amounts of from about 3 to 8 pounds of quartz per gallon of paint compositon, said quartz having a refractive index in the range between about 1.41 and about 1.54 and being of a particle size retained by a #270 U.S. Standard Screen and passed by a #60 U.S. Standard Screen and being irregularly shaped and rough-surfaced to provide light reflecting surfaces.

8. A paint as claimed in claim 7 in which the particulate solids are suspended with calcium linoleate.

9. A paint as claimed in claim 7 in which said particulate solids are suspended with aluminum stearate.

10. A paint as claimed in claim 7 in which the bulk of said quartz particles are retained by a #140 U.S. Standard Screen and passed by a #80 U.S. Standard Screen.

11. A paint as claimed in claim 7 in which said particles are irregular in shape.

12. A highway surface subject to vehicular traffic having a traffic marking stripe thereon adapted to redirect the beam of a motorist's headlight back toward him to provide high nighttime visibility and possessing enhanced durability under normal conditions of abrasive vehicular wear, said marking stripe being a coating constituted by a highway marking paint consisting essentially of an organic film-forming vehicle containing dispersed therein a reflective pigment and translucent crystalline silicon dioxide particles having a refractive index in the range of about 1.41 to about 1.54, said particles being sufficiently large to be retained by a #270 U.S. Standard Screen and passing through a #60 U.S. Standard Screen and being irregularly shaped and rough-surfaced to provide light reflecting surfaces.

13. A highway surface having a traffic marking stripe thereon as recited in claim 12 in which said marking stripe is abraded to expose a large portion of the upper surface of said particles, said particles being of irregular shape and resisting dislodgment by the keying action of the irregularities in shape in said marking stripe.

14. A highway surface having a marking stripe adapted to redirect the beam of a motorist's headlights back toward him to provide high nighttime visibility being a coating constituted by a highway marking paint consisting essentially of an organic film-forming vehicle containing dispersed therein a reflective pigment and translucent $SiO_2$ crystalline particles having a refractive index of approximately 1.41 to 1.54, said particles being sufficiently large to be retained by a #270 U.S. Standard Screen and passing through a #60 U.S. Standard Screen and said coating holding the silicon dioxide particles with upper portions thereof in exposed positions and said particles being by their irregularity of shape keyed to the layer of paint and thereby resist dislodgement.

References Cited in the file of this patent

UNITED STATES PATENTS

| | | |
|---|---|---|
| 416,278 | Turley et al. | Dec. 3, 1886 |
| 1,598,505 | Ramsden | Aug. 31, 1926 |
| 1,986,591 | Meyer | Jan. 1, 1935 |
| 2,043,414 | Korff | June 9, 1936 |
| 2,578,883 | Frick | Dec. 18, 1951 |
| 2,635,087 | Deniston | Apr. 14, 1953 |
| 2,773,780 | Koenecke | Dec. 11, 1956 |
| 2,865,266 | Wynn | Dec. 23, 1958 |

FOREIGN PATENTS

| | | |
|---|---|---|
| 727,347 | France | June 16, 1932 |
| 464,864 | Great Britain | Apr. 26, 1937 |

OTHER REFERENCES

"Metallic Soaps," Metsap Chemical Co. Inc., Harrison, N.J., page 4.